(No Model.)
T. H. CURTIS.
APPARATUS FOR CATCHING AND ELEVATING HOGS.
No. 458,018. Patented Aug. 18, 1891.
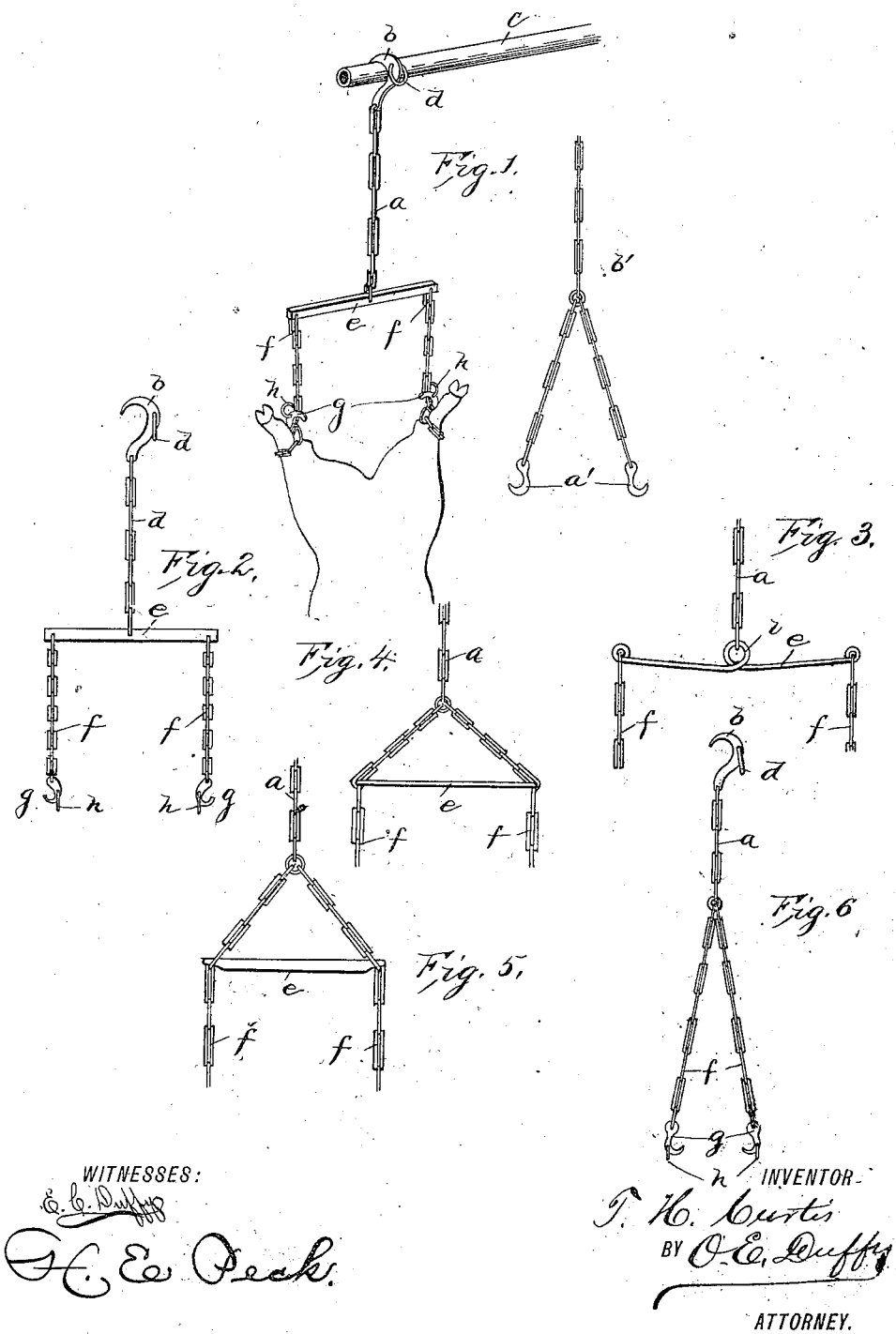
WITNESSES:
INVENTOR
T. H. Curtis
BY
ATTORNEY.

UNITED STATES PATENT OFFICE.

THEODORE H. CURTIS, OF CLEVELAND, OHIO.

APPARATUS FOR CATCHING AND ELEVATING HOGS.

SPECIFICATION forming part of Letters Patent No. 458,018, dated August 18, 1891.

Application filed February 13, 1891. Serial No. 381,305. (No model.)

*To all whom it may concern:*

Be it known that I, THEODORE H. CURTIS, of Cleveland, in the county of Cuyahoga and State of Ohio, have invented certain new and useful Improvements in Apparatus for Catching and Elevating Hogs; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in apparatus for catching and elevating hogs, more particularly in hog-catchers.

The object of the invention is to provide an improved device for securing a hog by the hind legs which shall be exceedingly simple, cheap, and durable in construction and composed of a minimum number of parts. These and other objects are accomplished by and my invention consists in certain novel features of construction and in combinations of parts, more fully described hereinafter, and particularly pointed out in the claims.

Referring to the accompanying drawings, Figure 1 is a view of the improved hog securer and suspender, showing a hog held thereby, this view also showing the means whereby the hog is released from said suspending device. Fig. 2 is a detail elevation of the securing and suspending device of Fig. 1. Figs. 3, 4, 5, and 6 are views of modifications.

The present invention comprises the suspending-chain $a$, at its upper end carrying the strong metal hook $b$, by which the device carrying the hog is attached removably to the trolley (not shown) traveling or the hook is slipped upon the track $c$. This hook is provided with the ring $d$, by which the hog-securing device is elevated to the trolley traveling on the track. The lower end of the suspending-chain $a$ is secured to the central portion of the transverse bar or equalizer $e$, from the opposite ends of which the two grappling-chains $f$ $f$ respectively hang. In other words, the equalizer holds apart or carries or partially carries two suitable grapples from its opposite end, each grapple consisting of any suitable grappling mechanism, such as chain $f$, at its lower end provided with strong metal hooks $g$, each hook being provided with loose ring $h$, as shown.

In the operation of catching a hog two men are employed with this device, each man taking one of the grappling-chains and wrapping it once or twice around the hind legs of the hog and then catching the hook in the chain, so as to form a "timber-hitch," as shown in Fig. 1. The hog is caught and secured by both hind legs and then suspended and elevated as ordinarily by means of the suspending-chain and its hook and an elevating-rope. (Not herein shown.) The hog is suspended from opposite ends of the equalizer-bar, and the legs are held separated thereby. When it is desired to drop the hog, the two hooks $a'$, carried by chains $b'$ are caught in the two rings $h$ of the grappling-hooks. The suspending-chain is then dropped from its support, thereby throwing the weight on chains $b'$, which releases hooks $g$ and chains $f$ from the hog, thereby dropping the hog while the suspending mechanism is held suspended by hooks $a'$.

In Fig. 3 the equalizer-bar is formed from one piece of spring-metal, (preferably one piece, as shown,) so as to form a spring equalizer-bar, by means of which the suspending-chain is attached. This form of equalizer forms a spring connection or support whereby sudden jars and shocks are removed and taken up, thereby preventing injury to the meat by sudden wrenches and jerks and consequent rupture of blood-vessels.

In Fig. 4 the grapples are directly secured to the suspending-chain, and the two grappling-chains are held apart by means of the equalizer.

Fig. 5 shows the suspending-chain provided with the two branch grappling-chains and a removable equalizer-bar inserted between grappling-chains to hold them apart.

In the last two constructions mentioned it is desirable to get the equalizer-bar as near the junction between the grappling-chains and the suspending-chains as possible.

Fig. 6 shows double grapple without the equalizer-bar, this construction consisting of the suspending-chain having a hook at its upper end and the two grappling-chains at their upper ends secured to the lower end of said suspending-chain and hanging freely therefrom and at their lower ends carrying the grappling hooks and rings. It should be observed that the equalizer is interposed between the grapples and the means for suspending the hog-catching device.

By means of this invention an exceedingly simple, cheap, and durable device is provided for elevating hogs by both hind legs, thereby obviating the disadvantages met with when elevating hogs by one leg and also simplifying all prior devices for elevating hogs by both legs.

The equalizer is a feature of the greatest importance. It places an equal strain on each leg and takes up any difference in length of grapple-chain caused by the application of said chain at points on the legs having different diameters, and also holds the legs apart, thereby preventing chafing, tearing, cutting, and other injury.

The word "chain" is used in the specification and claims; but I do not limit myself to the use of the chain, as any other suitable connection can be employed, such as a rope or cable or other strong flexible means.

This present invention has no relation to, and I do not herein claim, devices for elevating beeves after they have been killed, skinned, &c., consisting of two trolleys having hooks at their lower ends to catch into the two legs of the carcass, and a detachable beef-tree arranged to engage the two trolleys and elevate the same to two tracks, where it is disengaged from the trolleys and lowered, so that the carcass can be divided and the halves thereof separately carried by their separate trolleys into a refrigerator-room; but

What I claim is—

1. A hog securing and suspending device, comprising a suspending means, two grapples, and a spring or vertically-yielding connection interposed between said grapples and said suspending means and supporting said grapples.

2. In combination, a suspending-chain, a spring equalizer-bar suspended therefrom, and the two grapple-chains, respectively, yieldingly suspended from opposite ends of said bar.

3. The device herein described for catching and elevating hogs, consisting of a single suspending-chain and the two separate loosely-hanging grapple-chains permanently secured to the suspending-chain and provided with grappling devices at their lower ends arranged to secure a hog by both hind legs and thereby equalize the strain on the joints and prevent kicking during elevation of the hog.

4. The hog-catching device consisting of the single suspending-chain, the two grapple-chains depending therefrom and permanently attached thereto and provided with means, substantially as described, at their lower ends, whereby the hog can be caught and elevated by both hind legs, and the interposed equalizer-bar, substantially as described, arranged to permanently hold said grapple-chains separated, as and for the purposes set forth.

In testimony that I claim the foregoing as my own I affix my signature in presence of two witnesses.

THEODORE H. CURTIS.

Witnesses:
GEO. F. ARNOLD,
JOHN F. LIGHTFOOT.